Sept. 29, 1959   W. F. HERLIHY   2,905,955
APPARATUS FOR MOLDING INFANTS' SHOES
Filed June 15, 1956   2 Sheets-Sheet 1
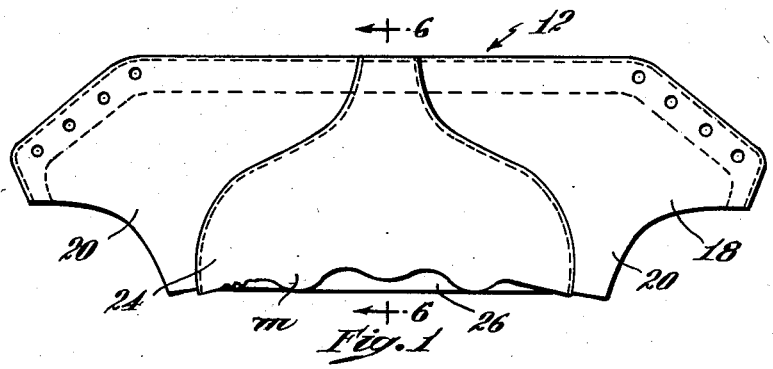
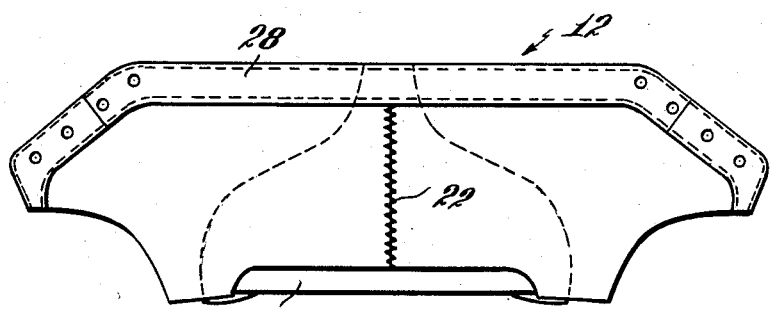
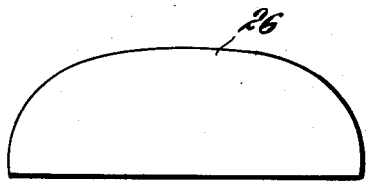
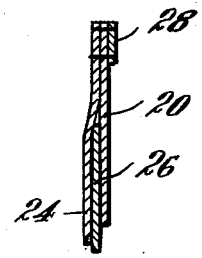
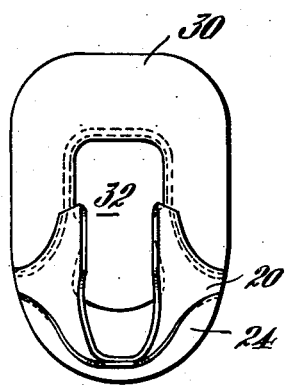
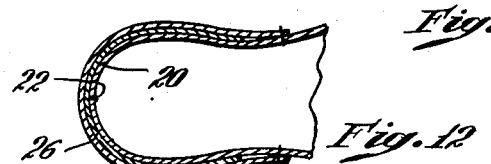
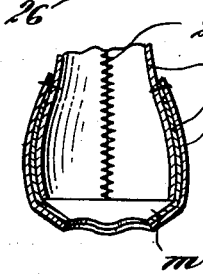
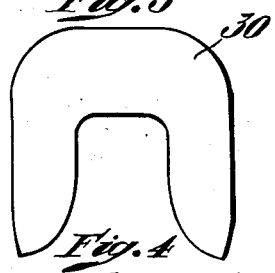
Inventor
William F. Herlihy
by Roberts, Cushman & Grover
Attys Sept. 29, 1959    W. F. HERLIHY    2,905,955
APPARATUS FOR MOLDING INFANTS' SHOES
Filed June 15, 1956    2 Sheets-Sheet 2

Inventor
William F. Herlihy
by Roberts, Cushman & Grover
Att'ys

2,905,955

APPARATUS FOR MOLDING INFANTS' SHOES

William F. Herlihy, Haverhill, Mass., assignor to Lowell Counter Company, Lowell, Mass., a copartnership Application June 15, 1956, Serial No. 591,671

2 Claims. (Cl. 12—97)

This invention pertains to infants' shoes and to a novel apparatus for making such shoes.

It is common practice to premold counter stiffeners prior to inserting them in the pocket between the quarters and the quarter lining and also in some instances to molding an assembled upper, consisting of an outer ply, counter stiffener and quarter lining, as shown for example in my Patent No. 2,541,057, by means of mold members having the shape of the rear end of the shoe to be made. Because of the reverse curvature of the heel end of a shoe that is, the narrowing down of the side portions as they extend forwardly from the heel end, it has been necessary to employ divided mold parts as otherwise it would be impossible to engage the male and female parts thereof. A divided mold is objectionable however because it leaves a permanent impression at the back part of the shoe along the line of the back seam corresponding to the line of division between the parts. This is particularly undesired in the manufacture of infants' shoes where appearance is the optimum consideration and more especially where, as herein illustrated, the back part has a broad backstay covering the back seam. Objects of this invention are therefore to provide an infants' shoe wherein the back part is unblemished by the presence of a mold mark or the like as described, and to a method of making a premolded upper with an unblemished exterior surface at the heel end. Other objects are to provide an infants' shoe, the back part of which is constructed to provide a smooth preshaped inner surface without lining or raised seams and an unblemished exterior surface extending from the heel seam forwardly to the forward extremities of the counter stiffener. Another object is to provide an infants' shoe with a heel end containing a counter stiffener incorporated therein without spoiling the continuity of the inner and/or outer surfaces of the heel end. A still further object is to provide molding means operable to apply molding pressure to the upper assembly in such fashion as to cause the rear end and quarter portions to take the shape of the heel end of the shoe to be made without leaving mold marks therein.

As herein illustrated the novel infants' shoe has at its heel end an inner ply constituted by the rear ends of the quarters, an intermediate ply constituted by a counter stiffener and an outer ply constituted by a broad backstay which is coextensive with the counter, the plies being adhesively joined and shaped under pressure so that the back part is curved in horizontal and vertical sections, providing a heel pocket, the interior surface of which corresponds to the exterior surface of the heel of a foot and the exterior surface of which is smooth and unblemished. In its formation the counter stiffener is inserted in the pocket provided between the exterior surface of the joined quarters and the interior surface of the exteriorly applied backstay and is then subjected to molding from within and without to stress the plies and redistribute them along curves both in horizontal and vertical sections, corresponding to the exterior surface of the heel of a foot and to cause them permanently to retain that shape. The molding apparatus comprises an undivided female part containing a cavity having a smooth continuous interior surface which is the converse of the exterior surface of the heel of a foot. A male die or plug having a complementary external surface is arranged to be moved into the female cavity to engage the upper draped over the male plug with the female cavity and by engagement to stress it as it is subjected to pressure therebetween to give it a permanent shape corresponding to the engaged male and female surfaces. The female part is open at its ends so that the lasting margin of the upper extends from one end and a wiper element is arranged adjacent that end for movement in a direction to fold the lasting margin of the upper inwardly against the corresponding end of the male part at a sharp angle to the back part to crease the upper at the base of the heel thereby to provide a permanently disposed heel attaching rand bounded by a shoulder constituted by the crease which corresponds in shape to the heel end of the outsole.

The invention will now be described in greater detail with reference to the accompanying drawings wherein:

Fig. 1 is a plan view of the quarter portions of the shoe before assembly with the forepart, viewed from the rear or outer side;

Fig. 2 is a view similar to Fig. 1 but showing the inside of the quarter portions;

Fig. 3 is a plan view of a quarter stiffener or counter prior to molding;

Fig. 4 is a plan view of the vamp of the shoe before assembly with the quarters;

Fig. 5 is a plan view of the assembled upper with the vamp and quarters joined and including a tongue;

Fig. 6 is a vertical section to larger scale taken on the line 6—6 of Fig. 1, showing the quarters with the counter stiffener assembled therein prior to molding;

Fig. 12 is a section taken on the line 12—12 of Fig. 8; and

Fig. 13 is a section taken on the line 13—13 of Fig. 8.

Figure 7:
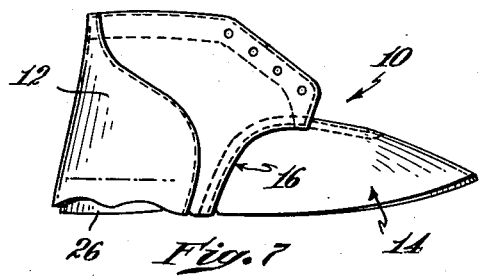
Fig. 7 is an elevation of the assembled upper prior to molding.

Referring to the drawings (Fig. 7), the upper 10 of the infants' shoe illustrated herein comprises a quarter portion 12 and a vamp portion 14, these parts being united by seams 16. As illustrated in Figs. 1 and 2, the quarter portion 12 has an inner ply 18 constituted by quarters 20 joined at their edges by a seam 22, an outer ply 24 constituting a backstay and an intermediate ply 26 constituting a counter stiffener. The seam 22 to provide for maximum flatness is formed by abutting the adjacent edges of the quarters and using herringbone stitching to join them. The backstay 24 has wing portions which extend forwardly and are substantially coextensive with the counter stiffener and is stitched to the exterior side of the quarter portions so as to provide a counter receiving pocket between the exterior side of the quarter portions and the inner side of the stay. Optionally a trim strip 28 is stitched to the inner side of the quarter portion along its upper edge and along the line of eyelets. As thus constructed the heel end of the shoe has a smooth continuous inner surface.

Figure 8:
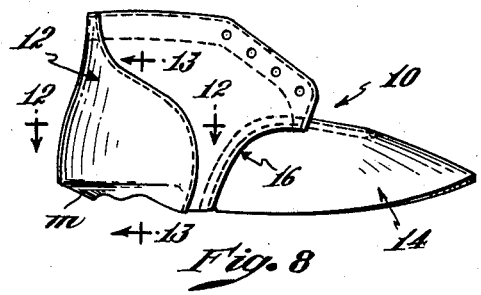
Fig. 8 is a corresponding view after molding.

The vamp 30 as shown in Fig. 4 is of conventional construction and includes a tongue 32 stitched thereto. The vamp and quarter portions are joined as shown in Fig. 5 by seams 16 and as thus put together the quarter portion 12 of the assembled upper is cylindrically curved in horizontal section but has none of the contour natural to the heel end of the foot that is, the substantially spherically-shaped heel pocket and reversely curved, wing portions along the sides of the heel which are curved in both horizontal and vertical sections. To provide for this and in accordance with the practice of the method employed herein the assembled upper, as shown in Fig. 7, is subjected to internal and external molding pressure to redistribute the plies at the back part of the shoe, as shown in Figs. 8, 12 and 13, to cause them to take a shape corresponding substantially to the surface contour of the heel of the foot which as will be seen involves pocketing the back part of the upper so as to impart a substantially spherically concave shape to it and bringing the lateral and forwardly extending wing portions of the quarter portion inwardly along reverse curves which narrow down from the heel end toward the shank. The spherically-shaped pocket at the rear extremity of the heel is evident particularly in Fig. 8, while the reversely curved shape and narrowing down of the wing portions of the quarters are shown most clearly in Figs. 12 and 13.

The lower or lasting margin m is also molded so that it is disposed inwardly with reference to the upper, as shown in Figs. 8 and 13. This is accomplished as will appear hereinafter by folding the margin in at a sharp angle to provide a continuous well-defined shoulder at the base of the heel. The inwardly folded margin provides a heel attaching flange or rand and in order that it shall not be too bulky the quarters are cut short around the back and the stay is likewise abbreviated by scalloping its lower edge.

The apparatus for accomplishing the aforesaid molding differs from that commonly employed for molding shoe counters in that instead of using divided mold parts single that is undivided mold parts are employed herein so as to avoid marking the upper and in particular the back-stay, since as illustrated herein the latter is continuous across the back of the heel, there being no exposed heel seam. While it would be substantially impossible to use an undivided mold for adult shoe construction because of the aforementioned narrowing down of the forwardly extending portions of the quarters which would prevent engagement of the mold parts, in an infant's shoe such as herein illustrated the quarter portions of the shoe are comparatively short so that the narrowing down of the forward portions of the quarters are very small hence there is not sufficient interlocking of the male and female mold parts to prevent operable engagement in spite of the reverse curvature involved.

By taking advantage of this fact, the further fact that there must be a clearance between the parts and the fact that the upper material may be squeezed it is possible to employ one-piece mating mold parts.

Figure 11:
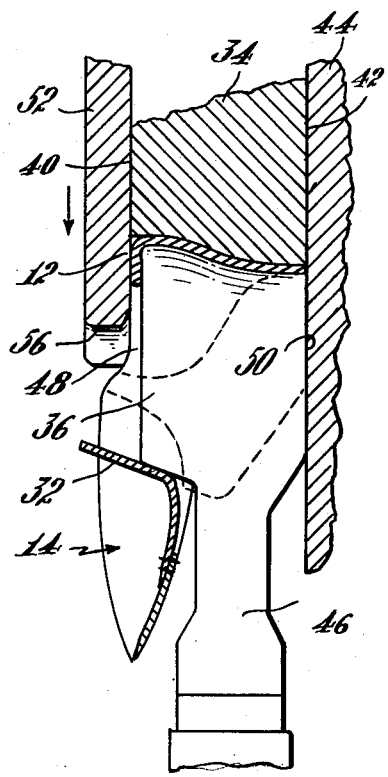
Fig. 11 is a vertical section taken on the line 11—11 of Fig. 10.

The mold parts comprise a female part 34 and a male part 36. The female part 34 has a concave recess 38, the surface of which has a contour which is the converse of the exterior surface of the heel of a foot at the back part and along the opposite sides extending forwardly toward the arch and is open at its ends. The open ends 40 and 42 of the part 34 are flat and the axial length of the part corresponds substantially to the depth of the shoe measured from the upper edge at the foot opening to the shoulder at the base of the heel. The part 34 is fastened rigidly to a portion of the machine frame 44 (Fig. 11) with the recess facing downwardly, with the end 42 next to the frame 44 and with the end 40 facing the front so as to be visible to the operator. Below the female part 34 there is mounted the male part 36 which is fastened in an upright position to a post 46 which is arranged to be moved vertically to and from the female part so as to enter the cavity 38. The male part 36 has a continuous exterior curved surface which is the complement of the interior surface of the female part but is of slightly smaller dimensions so that there will be sufficient clearance between the two parts when they are brought together to accommodate the thickness of the upper stock. Preferably this clearance is somewhat less than the thickness of the upper stock so that as the parts are brought together there is an actual stressing and stretching of the parts which assists in shaping them and causing them permanently to retain the shape imparted thereto.

Figure 10:
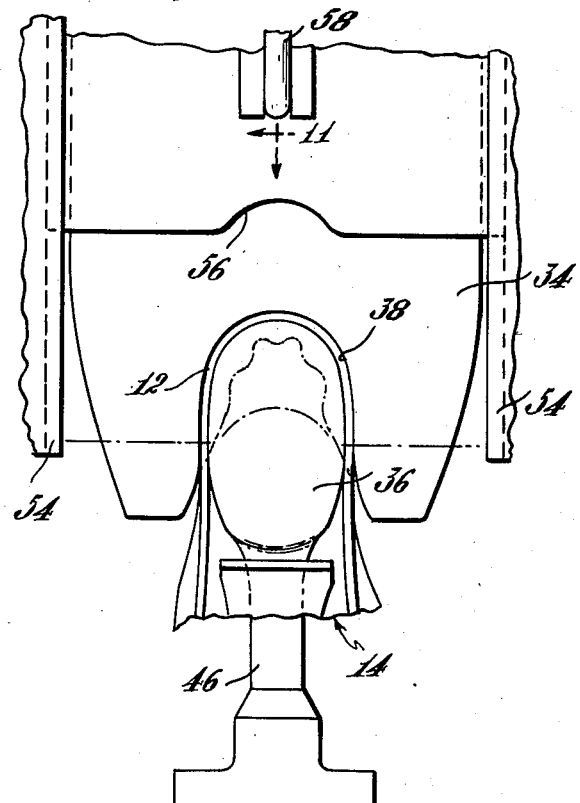
Fig. 10 is a front elevation of the mold parts engaged with an upper located therebetween.

While as shown in Fig. 10 the mouth of the female cavity is narrower than its rear part the cavity is short in depth so that the enlarged forward end of the male part reduced by the clearance mentioned above is small enough to enter the mouth of the cavity. The clearance is kept small enough, however, so that as the male part is engaged with the female cavity it frictionally stresses the upper thereby not only shaping the upper but ironing and smoothing the surface thereof so as to remove wrinkles and to give the exterior surface a high gloss.

The lateral sides 48 and 50 of the male part are arranged so that the side 50 slidably engages the frame 44 and is so maintained in alignment with the female part and the side is parallel to the opposite end 40 of the female part but spaced inwardly therefrom by about the thickness of the stock. A reciprocal slide plate or wiper 52 is mounted in guides 54 carried by the frame against the end 40 of the female part 34 for movement from a position elevated from the recess downwardly across the recess and across the side 48 of the male part. Preferably the wiper has a circular notch 56 in its leading edge which is symmetrical with respect to the cavity in the female part to assist in gathering the margin as it is folded. The wiper is provided with means 58 for effecting its movement.

In operation an assembled upper such as shown in Fig. 7 is draped over the male part 36 by pulling the tongue 32 of the upper downwardly and forcing the open top of the upper over the head of the male part from the front side so that the top of the upper coincides with the side 50 of the male part. As thus positioned the bottom of the upper coincides with the side 48 and the lasting margin m of the upper projects forwardly from the side 48 toward the operator. With the upper so mounted on the male part the latter is raised to bring it into engagement with the female part 34 and as the surfaces begin to interengage the upper is stressed and stretched by the frictional engagement due to the limited space between the parts so as to smooth it out and apply molding pressure. After the parts are fully engaged the wiper 52 is lowered to fold and wipe the lasting margin inwardly against the end 48 of the male part.

The consistency of the counter stiffener is such that it tends to retain the shape imparted to it by application of pressure and is inherently adhesive so that the molding causes the parts to become adhesively bonded. Optionally, prior to inserting the counter in the heel pocket adhesive of a suitable kind may be applied to the surfaces so that during the molding operation of the alteration of the surface contours of the parts and redisposition of the parts relative to each other is made permanent by the setting of the adhesive between the surfaces. The interengaged surfaces and the angular disposition of the lasting margin further enhance interlocking of the parts and tend to prevent relative movement between them.

Figure 9:
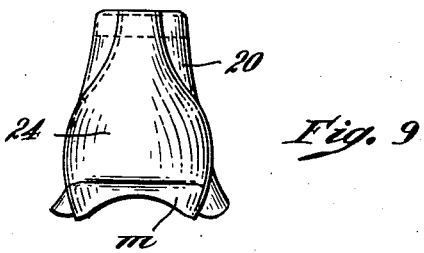
Fig. 9 is an elevation of the rear end of the shoe after molding.

As will be seen by reference to Figs. 8 and 9 the back part after molding is no longer cylindrically curved as shown in Fig. 7, but is now curved in both horizontal and vertical section.

Cold molding suffices to produce a permanent disposition of the parts, however, it is to be understood that if the circumstances require hot molding could be employed.

The essential features of the apparatus as described are undivided or one-piece mold parts that is, both female and male parts have continuous smooth surfaces corresponding in contour to the inner and outer surfaces of the back part of the shoe which are adapted because of their continuity to provide a back part which is unblemished and smooth throughout its entire surface contour affording a smooth interior surface which gives good foot comfort and a smooth exterior surface which is of pleasing appearance. The mode of actuating the male and female parts to move them into and out of engagement is a matter of choice.

It should be understood that the present disclosure is for the purpose of illustration only and that this invention includes all modifications and equivalents which fall within the scope of the appended claims.

I claim:

1. Apparatus for molding the back part of an infant's shoe to impart to the heel and reversely curved inner and outer surfaces corresponding to the exterior surface contour of of the heel of a foot, comprising a rigid male part having an unyielding convex surface over which may be placed a part to be molded, said convex surface corresponding in shape to the larger end of an ovoid, and a female part having a recess into which the male part may be introduced, which recess is complementary in section to that of the male part, and is characterized in that it is unyieldingly rigid throughout, and has a continuous uninterrupted, smooth, concave surface, portions of which extend forwardly from a closed circularly curved back along gradually converging lines to an open mouth which is narrower at its entrance than the maximum transverse dimension of the recess and is wider than the maximum transverse dimension of the male part.

2. Apparatus according to claim 1, further characterized in that there is a clearance between the male and female parts when interengaged, not greater than the thickness of the part to be molded therebetween, and that the clearance between the maximum dimension of the male part and the width of the mouth of the female part is less than the thickness of the part to be molded.

References Cited in the file of this patent

UNITED STATES PATENTS

| | | |
|---|---|---|
| 1,027,408 | Engel | May 28, 1912 |
| 1,048,514 | Fleury | Dec. 31, 1912 |
| 1,165,482 | Young | Dec. 28, 1915 |
| 1,280,303 | Ricks | Oct. 1, 1918 |
| 1,514,756 | Beier | Nov. 11, 1924 |
| 2,111,351 | Bailey et al. | Mar. 5, 1938 |
| 2,162,008 | Golden | June 13, 1939 |
| 2,199,338 | Golden et al. | Apr. 30, 1940 |
| 2,217,274 | Hartwell et al. | Oct. 8, 1940 |
| 2,251,425 | Scharffenberg | Aug. 5, 1941 |
| 2,292,930 | Daniels | Aug. 11, 1942 |
| 2,391,445 | Cohen | Dec. 25, 1945 |
| 2,433,266 | Dodge | Dec. 23, 1947 |
| 2,487,421 | Calder | Nov. 8, 1949 |
| 2,672,632 | Herlihy | Mar. 23, 1954 |